2,772,565

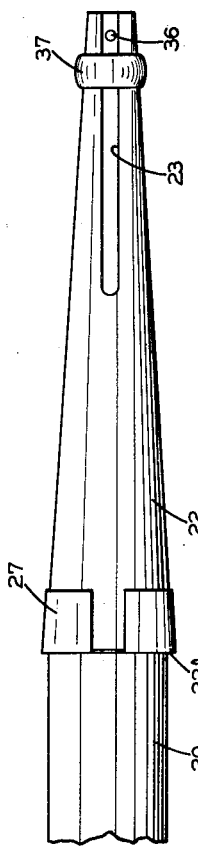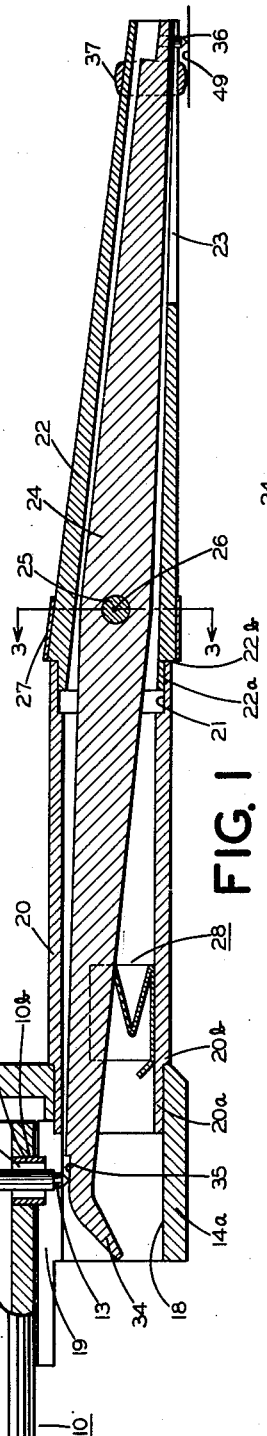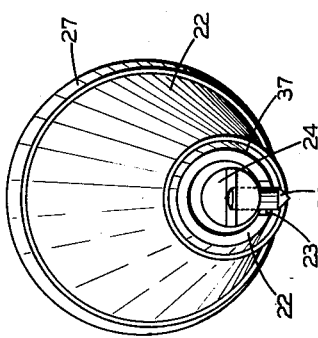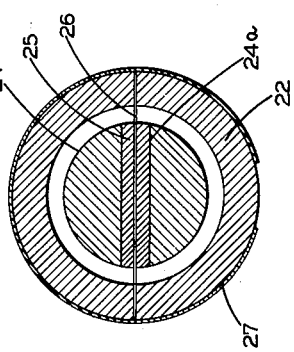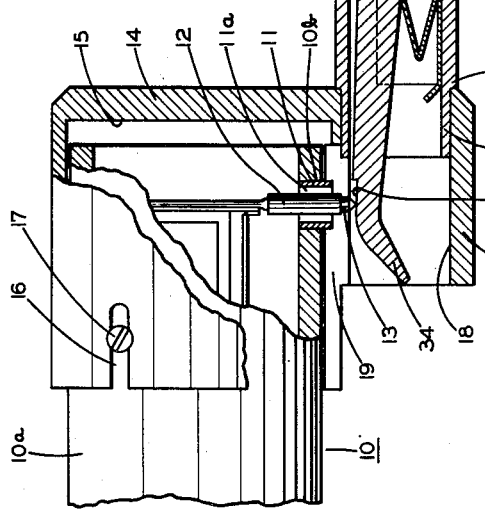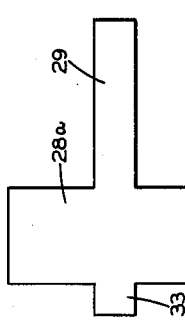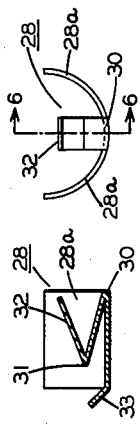
INVENTORS.
ARLING DIX BROWN JR.
IGNACIO P. ECHEAGARAY
MILTON GROSS
LEO F. VALENTI
BY
William J. Flynn
ATTORNEY United States Patent Office 2,772,565
Patented Dec. 4, 1956

SMALL BORE ADAPTER FOR SURFACE ROUGHNESS INDICATOR

Arling Dix Brown, Jr., East Cleveland, Ignacio P. Echeagaray and Milton Gross, Cleveland, and Leo F. Valenti, Garfield Heights, Ohio, assignors to Clevite Corporation, Cleveland, Ohio, a corporation of Ohio Application May 13, 1954, Serial No. 429,644

11 Claims. (Cl. 73—105)

This invention relates to an adapter for a surface roughness indicating instrument for the purpose of determining the surface roughness at locations of limited accessibility, such as at holes as small as one-eighth inch in diameter.

In one practical surface roughness measuring instrument there is employed a pickup head which carries a displacement stylus for engagement with the surface under test. The pickup head is moved back and forth across the test surface and the displacements of the stylus due to surface roughness during such movement of the pickup head are used to actuate an indicating meter. The cross-sectional size of the pickup head is such that it would preclude the use of such a pickup head in numerous applications involving the determination of surface roughness at areas of limited accessibility, such as small holes and slots, or on gear teeth. For example, in one practical embodiment the pickup head has a cross-sectional size corresponding to a diameter of one-half inch. The present invention is directed to an adapter for attachment onto such a pickup head which will enable the determination of roughness on surfaces which otherwise could not be reached because of inaccessibility to the pickup head stylus used for the ordinary applications of the instrument.

Accordingly, it is an object of the present invention to provide a novel adapter for ready attachment onto the pickup head of a surface roughness measuring instrument which enables the determination of surface roughness on surfaces of very limited accessibility, such as in holes and slots as small as one-eighth inch across.

It is also an object of this invention to provide such an adapter capable of precise and accurate operation, yet so constructed as to be relatively easy to assemble on a production basis, in spite of the small size of its parts.

For the accomplishment of the foregoing purposes, as well as such further objects and advantages of the present invention as may be apparent hereinafter, there may desirably be provided the specific arrangement described in detail hereinafter and illustrated in the accompanying drawing.

In the drawing:

Figure 1 is a longitudinal section, on a greatly enlarged scale, through the adapter of the present invention, shown mounted on the stylus end of the pickup head of a known surface roughness measuring instrument;

Figure 2 is a fragmentary bottom elevation of the forward end of the adapter;

Figure 3 is a section, taken along the line 3—3 in Fig. 1, through the pivotal mounting for the lever in the adapter;

Figure 4 is an end view of the Fig. 1 assembly, viewed from the right in Fig. 1;

Figure 5 is a development of the bias spring for the stylus lever in the adapter;

Figure 6 is a longitudinal section through the bias spring; and

Figure 7 is an end view of the bias spring, viewed from the left end in Fig. 6.

Referring to Fig. 1, the adapter of the present invention is shown mounted on the stylus end of the pickup head of a known surface roughness measuring instrument. This pickup head is indicated generally at 10. The pickup head includes a cylindrical housing 10a which adjacent its forward end is formed with a bottom opening 10b in which is located a cylindrical sleeve 11. The pickup head stylus 12 is mounted to reciprocate freely through the sleeve 11. At its lower end the stylus 12 carries a diamond tip 13 disposed below the housing of the pickup head. In the use of the pickup head for roughness determinations on surfaces where accessibility is no problem, the substantially conical lower end of the diamond tip 13 on stylus 12 engages the surface whose roughness is to be determined. As the pickup head is moved back and forth across the surface under test, the stylus reciprocates in accordance with the peaks and valleys in the test surface. The stylus movements are converted into electrical signals which actuate an indicating meter by means of a suitable arrangement, which forms no part of the present invention and whose description herein is considered unnecessary.

Where the surface whose roughness it is desired to determine is not accessible to the pickup head stylus, there may be attached onto the stylus end of the pickup head the adapter of the present invention. This adapter includes a housing member 14 which defines a cylindrical upper mounting recess 15 complementary to the cylindrical housing of the pickup head. This recess on the adapter housing member 14 is open at the back end, enabling the housing member 14 to be slipped onto the stylus end of the pickup head housing 10a. To facilitate locating the adapter housing member 14 properly on the pickup head, the adapter housing member 14 is formed with a plurality of open-ended slots 16 which receive the screws 17 carried by the pickup head when the adapter housing member 14 is assembled onto the pickup head. The housing member 14 is formed with a lower portion 14a disposed below the upper mounting portion which defines recess 15. The lower portion 14a of adapter housing member 14 defines a cylindrical lower recess 18. An open-ended slot 19 in the adapter housing member 14 interconnects the upper mounting recess 15 and the lower recess 18. The pickup head stylus extends freely down through slot 19 into the lower recess 18. The adapter housing member 14 is of suitable rigid material, such as brass.

The adapter housing also includes a rigid cylindrical tube 20, of brass or other suitable material, which projects forward from the lower portion 14a of the adapter housing member 14. Tube 20 at its rear end is formed with an integral reduced neck 20a which is snugly received in the front end of the lower recess 18 in the adapter housing member 14. Tube 20 presents an annular transverse shoulder 20b at the forward end of its reduced neck portion 20a which limits the insertion of tube 20 into the recess 18. At this location the tube 20 is secured to the adapter housing member 14 by soldering.

At its forward end the tube 20 is formed with a counterbore 21 at which is secured a truncated conical tube 22, which projects forward from the cylindrical tube 20 and forms an extension thereof. Tube 22 is of progressively smaller size toward its forward end. Tube 22 terminates at its rear end in a reduced neck 22a, which is snugly received in the counterbore 21. Tube 22 presents a transverse annular shoulder 22b at the forward end of its neck 22a which abuts against the forward end of tube 20 and thereby limits the insertion of tube 22 into tube 20. The tubes 20 and 22 are secured together at this spot by soldering. The axis of the conical tube 22 is disposed at an angle to the horizontally extending axis of the cylindrical tube 20, such that the outer surface on the bottom of conical tube 22 extends horizontal. At its forward end the conical tube 22 is formed with an open-ended slot 23 along the bottom. Tube 22 at its inside includes an angle of six degrees or so.

An elongated solid lever 24 of aluminum or other light material of suitable rigidity is pivotally mounted in the assembly of tubes 20 and 22. Adjacent its forward end the lever carries a downwardly projecting stylus 36. At its middle the lever 24 is formed with a transverse bore 24a (Fig. 3) in which is press fit a soft aluminum plug 25. The pivotal support for the lever 24 is in the form of a thin wire 26, preferably about 0.016 inch in diameter, which extends horizontally through opposite sides of tube 22 and through the plug 25 carried by lever 24. The lever 24 tapers inwardly in both directions along its length away from its middle, at which it is pivotally mounted. By thus making the mass of the lever a maximum at its pivot, the problem of mechanical resonance of the lever is minimized. The tapered construction of the lever also enables the lever to have free movement within the tube assembly 20, 22 throughout its operative range of displacement. This is particularly advantageous at the forward end of the lever since the reduced cross-sectional size of the lever there enables the housing tube 22 to be correspondingly smaller without unduly restricting the lever movement, and, in turn, this reduced size of tube 22 at its forward end enables the adapter to be used in extremely small bores and other closely confined spaces. The solid rod construction of the lever, tapered in either direction away from its pivot midway along its length, has been found to provide maximum stiffness without excessive weight.

The tube slot 23 enables the lever 24 to be inserted into tube 22 after the stylus 36 has been fastened onto lever 24. This allows the rather difficult operation of fastening the stylus onto the lever to be done in a prior step, without obstruction by tube 22.

In the assembly of the pivotal mounting, the tube 22 and lever 24 are supported in a suitable fixture which maintains lever 24 concentric within tube 22. By means of a 0.0135 inch drill, a cross hole for the reception of the pivot wire 26 is then drilled through the opposite side walls of tube 22, as well as lengthwise through the plug 25. Next, the 0.016 inch diameter piano wire 26 is press fitted through these aligned holes. The wire is then turned back and forth several times so that it widens the holes in the opposite side walls of tube 22, so that these holes are exactly complementary to this wire. The wire is thus capable of "creeping," or turning, in these holes without, however, having a loose fit therein. However, this hole widening action does not take place appreciably in the lever plug 25 when the wire 26 is turned, due to the relatively long length of the wire within the plug. Due to this length the lever plug 25 exerts greater restraint against the wire 26 than do the thin side walls of tube 22, and so the plug prevents the wire from widening the plug hole to the extent that the thin side walls of the brass tube 22 permit this action to take place in the holes in opposite sides of this tube. Accordingly, the wire 26 has a tighter press fit in plug 25 than in the opposite sides of tube 22. In one practical construction, the side wall of tube 22 is about 0.030 inch thick at the pivot, and the plug 25 is 0.136 inch long and 0.0625 inch in diameter. The lever at its pivot is spaced from the tube, so that the tube imposes no restraint on the lever movement.

The ends of wire 26 are ground flush with the outside of tube 22. For retaining the pivot wire in place in tube 22 a flexible, adhesive backed band 27 of aluminum is then wrapped around the outside of tube 22 to extend across both ends of pivot wire 26. The band 27 restricts wire 26 from moving sideways in tube 22, and the tight press fit of the lever plug 25 on wire 26 prevents the lever from moving along the wire, transversely within tube 22. When the lever pivots, the wire 26 turns integral with the lever in the precisely complementary snug holes in the walls of tube 22.

Due to its small size, the drill often breaks in the work piece, and as a practical matter the work piece and the broken drill therein must be discarded. If the plug 25 were not provided, then breakage of the drill in the lever 24 would necessitate throwing away the lever. However, with the separate plug 25 in the lever, as shown, should the drill break, the plug with the broken drill therein may be knocked out of the lever 24 and discarded, while the lever itself need not be thrown out. This results in a considerable economy in production.

A compression spring 28 is mounted within tube 20 and acts against lever 24 to bias the rear end of lever 24 upward within tube 20 and to bias the forward end of this lever downward. This spring may be formed from a generally cross-shaped blank having the configuration shown in Fig. 5. The cross-piece 28a of this blank is bent to arcuate shape (Fig. 7) for snug reception within the bore of tube 20. The front leg 29 of the spring blank is bent back at 30 to overlie the middle of the arcuate cross-piece 28 and is bent back at 31 upon itself to present a forwardly extending, upwardly biased leg 32 which at its forward end bears against the underside of lever 24. The rear extension 33 of the spring blank is bent upward to facilitate the insertion of the formed spring into tube 20.

At its rear end the lever 24 is formed with a downwardly projecting extremity 34. Immediately forward of the depending rear extremity 34, the lever 24 is cut away along its top face to provide a flat surface 35, which extends horizontal in the normal, unactuated position of the lever, as shown in Fig. 1. In its normal position, the lever 24 is biased by spring 28 to position the flat 35 on the lever 0.010 inch or less below the bottom of slot 19. This flat is for engagement with the tip 13 of the pickup head stylus. At this time, the lever 24 engages the inner bottom surface of tube 22 just forward of the lever stylus 36.

A probe collar 37 extends around the outside of tube 22 adjacent the latter's forward end, a short distance behind the lever stylus 36. This probe collar is provided to engage and ride across the peaks of the irregularities in the surface to be measured. In one practical embodiment the probe collar is $1/16$ inch long and has an outer surface which is arcuate along the length of this collar, with a $1/8$ inch arc radius. In this particular embodiment, the tube assembly 20, 22 extends slightly longer than 2 inches forward from the front end of the adapter housing member 14. The distance along lever 24 between stylus 36 and the point on flat 35 engaged by the pickup head stylus is 2.200 inches, and the pivot wire is located exactly midway between these points. The probe collar has its rear edge located about 0.140 inch behind the forward edge of tube 22. The forward end of the assembly, including the probe collar 37, is less than $1/8$ inch across. Thus, the adapter will penetrate a hole of only $1/8$ inch diameter to a depth of $3/16$ inch. For wider holes the adapter can be inserted deeper. Since the maximum outer diameter of the tube assembly, including the thickness of probe collar 37 on the bottom side of the tube assembly, in this particular embodiment is less than $1/4$ inch, the adapter may be used for surface roughness measurements on holes $1/4$ inch or wider up to 2 inches deep.

In the use of the above-described adapter of the present invention, the mounting portion 14 of the adapter housing is slipped onto the front end of the housing 10a of the pickup head. When this action takes place, the screws 17 carried by the pickup head serve as guides for the open-ended slots 16 formed in the adapter housing member 14, so as to insure that the adapter housing is properly mounted on the pickup head, with the slot 19 in the adapter housing positioned to permit the pickup head stylus 13 to move freely. While the adapter is being slipped onto the standard pickup head, the diamond tip 13 of the pickup head stylus rides up along the upwardly inclining rear extremity of the lever 24 without any possibility of damaging the stylus tip by this action. With the lever 24 pivotally mounted in the tube assembly 20, 22, as shown in Fig. 1, the bias spring 28 exerts a force on the lever stylus equal to about 4 grams downward force at the lever stylus 36. This bias is such that the lever 24 exerts on the stylus 12 of the pickup head a force which maintains the pickup head stylus about halfway between its unactuated position, projecting down through the sleeve 11, and its fully retracted position. The pickup head stylus in this position exerts a downward force of about 2 grams, so that the net force on the lever stylus 36 is about 2 grams downward.

In operation, the adapter is inserted into the restricted opening and the underside of the probe collar 37 is caused to ride across the surface to be measured. Thus, this probe collar serves to define a reference plane with respect to which the lever stylus 36 is deflected as it engages peaks and valleys in the surface under test. Such deflections of stylus 36 move the lever 24 about its pivotal axis, to in turn impart corresponding movement (though in the opposite direction) to the stylus 12 of the pickup head. The wire 26, by virtue of its tight press fit in plug 25 and the tight press fit of the plug in lever 24, has in effect a fixed connection to lever 24, so that the wire turns integral with the lever when the lever pivots. With its opposite ends snugly received in the precisely complementary holes in opposite sides of tube 22, the wire turns in these holes to thereby provide bearings for the pivotal movement of the lever.

While there has been disclosed in the above description and the accompanying drawing a specific preferred embodiment of the present invention, it is to be understood that various modifications, omissions and refinements which depart from the disclosed embodiment may be adopted without departing from the spirit and scope of this invention.

We claim:

1. An adapter for attachment onto the pickup head of a surface roughness measuring instrument, said adapter comprising a housing having a mounting portion for attachment onto the stylus end of the pickup head of the surface roughness indicator, said housing including elongated tube means of small cross-section extending forward from said mounting portion, a lever of solid cross-section extending lengthwise through said tube means and tapering in either direction away from its pivotal mounting, said lever forward of its pivotal mounting being completely disposed within said tube means, and said tube means being of reduced size at its forward end, a thin stiff wire extending transversely through the lever and fixedly connected thereto midway along the lever, said wire at its opposite ends being snugly received in precisely complementary holes in opposite sides of the tube means which permit the wire to turn therein integral with the lever and thereby provide bearings for pivotal movement of the lever in said tube means, said lever at its forward end carrying a stylus projecting beyond said tube means for engagement with the test surface, and said lever at its opposite end presenting a surface for engagement with the stylus of the pickup head to actuate the pickup head stylus in response to displacement of the lever stylus.

2. An adapter for attachment onto the pickup head of a surface roughness measuring instrument, said adapter comprising a housing having a mounting portion for attachment onto the stylus end of the pickup head of the surface roughness measuring instrument, said housing including elongated tube means of small cross-section projecting forward from said mounting portion, a lever pivotally mounted in said tube means and extending lengthwise therethrough, said tube means at the pivotal mounting of the lever being of thin-walled construction and the lever at its pivotal mounting being spaced from the inner surface of the tube means entirely around the lever, said lever at its pivotal mounting carrying a plug press fit transversely through the lever and having a length several times the wall thickness of the tube means thereat, a thin stiff wire press fit through said plug and thereby fixedly received therein to prevent relative displacement between the wire and the plug and lever, said wire at its opposite ends being snugly received in precisely complementary holes in opposite sides of said tube means which permit the wire to turn therein integral with the lever to thereby provide bearings for the pivotal movement of the lever in said tube means, said lever at its forward end carrying a stylus which projects beyond said tube means for engagement with the surface under test, and said lever at its opposite end presenting a surface for engagement with the stylus of the pickup head to actuate the latter upon displacement of the lever stylus.

3. The adapter of claim 2, wherein said lever is solid in cross-section and tapers in either direction away from its pivotal mounting, said lever forward of its pivotal mounting being completely disposed within said tube means, and said tube means tapers inwardly toward its forward end.

4. An adapter for attachment onto the pickup head of a surface roughness measuring instrument, said adapter comprising a housing which includes an upper mounting portion defining an open-ended recess shaped and dimensioned to receive snugly the stylus end of the pickup head when mounted thereon, said mounting portion of the adapter housing being formed with a bottom opening for freely passing the pickup head stylus, said adapter housing also including tube means of reduced cross-section extending forward from said mounting portion at the lower end of the latter, said tube means defining a bottom opening at its forward end, a lever pivotally mounted in said tube means and extending lengthwise therethrough, said lever projecting forward from its pivotal mounting and at its forward end carrying a stylus which projects freely down through said bottom opening in the tube means at the latter's forward end, said lever projecting rearward from its pivotal mounting and directly below said bottom opening in said mounting portion of the adapter housing presenting a flat upper face for engagement with the pickup head stylus, a spring acting against said lever to bias its rear end upward and its forward end downward, and said lever having a depending rear extremity which presents a top surface which inclines up toward said flat upper face on the lever for engagement by the tip of the pickup head stylus as the adapter is inserted onto the pickup head.

5. An adapter for attachment onto the pickup head of a surface roughness measuring instrument, said adapter comprising a housing which includes an upper mounting portion defining an open-ended recess shaped and dimensioned to receive snugly the stylus end of the pickup head when mounted thereon, said mounting portion of the adapter housing being formed with a bottom opening for freely passing the pickup head stylus, said adapter housing also including tube means of reduced cross-section extending forward from said mounting portion at the lower end of the latter in a direction substantially parallel to the length of said recess in the mounting portion, said tube means defining a bottom opening at its forward end, a lever pivotally mounted in said tube means and extending lengthwise therethrough, said tube means at the pivotal mounting for the lever being of thin-walled construction and the lever being spaced thereat from the inner surface of the tube means entirely around the lever, said lever at its pivotal mounting carrying a plug press fit through the lever and having a length several times the wall thickness of the tube means thereat, and a thin stiff wire press fit through said plug and thereby fixedly received therein to prevent relative displacement between the wire and the plug and lever, said wire at its opposite ends being snugly received in precisely complementary holes in opposite sides of said tube means which permit the wire to turn therein integral with the lever to thereby provide bearings for the pivotal movement of the lever in said tube means, said lever projecting forward from its pivotal mounting and at its forward end carrying a stylus which projects freely down through said bottom opening in the tube means at the latter's forward end, said lever projecting rearward from its pivotal mounting and directly below said bottom opening in said mounting portion of the adapter housing presenting a flat upper face for engagement with the pickup head stylus, and a spring acting against said lever to bias its rear end upward and its forward end downward.

6. An adapter for attachment onto the pickup head of a surface roughness measuring instrument, said adapter comprising a housing which includes an upper mounting portion defining an open-ended recess shaped and dimensioned to receive snugly the stylus end of the pickup head when mounted thereon, said mounting portion of the adapter housing being formed with a bottom opening for freely passing the pickup head stylus, said adapter housing also including tube means of reduced cross-section extending forward from said mounting portion at the lower end of the latter, said tube means defining a bottom opening at its forward end, a lever pivotally mounted in said tube means and extending lengthwise therethrough, said lever being solid in cross-section and tapering inwardly along its length in either direction away from its pivotal mounting, and said tube means tapering inwardly along its length toward its forward end, said lever projecting forward from its pivotal mounting and at its forward end carrying a stylus which projects freely down through said bottom opening in the tube means at the latter's forward end, said lever projecting rearward from its pivotal mounting and directly below said bottom opening in said mounting portion of the adapter housing presenting a flat upper face for engagement with the pickup head stylus, a spring acting against said lever to bias its rear end upward and its forward end downward, and said lever having a depending rear extremity which presents a top surface which inclines up toward said flat upper face on the lever for engagement by the tip of the pickup head stylus as the adapter is inserted onto the pickup head.

7. An adapter for attachment onto the pickup head of a surface roughness measuring instrument, said adapter comprising a housing which includes an upper mounting portion defining an open-ended recess shaped and dimensioned to receive snugly the stylus end of the pickup head when mounted thereon, said mounting portion of the adapter housing being formed with a bottom opening for freely passing the pickup head stylus, said adapter housing also including tube means of reduced cross-section extending forward from said mounting portion at the lower end of the latter in a direction substantially parallel to the length of said recess in the mounting portion, said tube means defining a bottom opening at its forward end, a lever pivotally mounted in said tube means and extending lengthwise therethrough, said tube means at the pivotal mounting for the lever being of thin-walled construction and the lever being spaced thereat from the inner surface of the tube entirely around the lever, said lever at its pivotal mounting carrying a plug press fit through the lever and having a length several times the wall thickness of the tube means thereat, and a thin stiff wire press fit through said plug and thereby fixedly received therein to prevent relative displacement between the wire and the plug and lever, said wire at its opposite ends being snugly received in precisely complementary holes in opposite sides of said tube means which permit the wire to turn therein integral with the lever to thereby provide bearings for the pivotal movement of the lever in said tube means, said lever projecting forward from its pivotal mounting and at its forward end carrying a stylus which projects freely down through said bottom opening in the tube means at the latter's forward end, said lever projecting rearward from its pivotal mounting and directly below said bottom opening in said mounting portion of the adapter housing presenting a flat upper face for engagement with the pickup head stylus, and a spring acting against said lever to bias its rear end upward and its forward end downward.

8. The adapter of claim 7, wherein said tube means adjacent its forward end carries a probe collar behind the stylus carried by the lever which presents a lower surface arcuate lengthwise along said tube means and disposed below the bottom of said tube means to engage and ride across the peaks of the surface irregularities in the test surface to thereby define a reference plane relative to which the stylus carried by the lever moves.

9. A small bore pickup for a surface roughness measuring instrument, comprising a housing presenting forwardly extending tube means, a lever pivotally mounted in said tube means and extending lengthwise therethrough, said tube means at the pivotal mounting for the lever being of thin-walled construction and the lever being spaced from the inner surface of the tube means entirely around the lever, said lever at its pivotal mounting carrying a plug press fit through the lever and having a length several times the wall thickness of the tube means thereat, and a thin stiff wire press fit through said plug and thereby fixedly received therein to prevent relative displacement between the wire and the plug and lever, and said wire at its opposite ends being snugly received in precisely complementary holes in opposite sides of said tube means which permit the wire to turn therein integral with the lever to thereby provide bearings for the pivotal movement of the lever in said tube means.

10. An adapter for attachment onto the pickup head of a surface roughness measuring instrument, said adapter comprising a housing which includes an upper mounting portion defining an open-ended recess shaped and dimensioned to receive snugly the stylus end of the pickup head when mounted thereon, said mounting portion of the adapter housing having a bottom opening for freely passing the pickup head stylus, said adapter housing also including tube means of reduced cross-section extending forward from said mounting portion at the lower end of the latter, said tube means defining a bottom opening at its forward end, a lever pivotally mounted in said tube means and extending lengthwise therethrough, said tube means at the pivotal mounting of the lever being of thin-walled construction and the lever at its pivotal mounting being spaced from the inner surface of the tube means entirely around the lever, said lever at its pivotal mounting carrying a plug press fit transversely through the lever and having a length several times the wall thickness of the tube means thereat, a thin stiff wire press fit through the plug and thereby fixedly received therein to prevent relative displacement between the wire and the plug and lever, said wire at its opposite ends being snugly received in holes in opposite sides of said tube means which permit the wire to turn therein integral with the lever to thereby provide bearings for the pivotal movement of the lever in said tube means, said lever projecting forward from its pivotal mounting and at its forward end carrying a stylus which projects freely down through said bottom opening in the tube means at the latter's forward end, said lever projecting rearward from its pivotal mounting and directly below said bottom opening in said mounting portion of the adapter housing presenting a flat upper face for engagement with the pickup head stylus, a spring acting against said lever to bias its rear end upward and its forward end downward, and said lever having a depending rear extremity which presents a top surface which inclines up toward said flat upper face on the lever for engagement by the tip of the pickup head stylus as the adapter is inserted onto the pickup head.

11. An adapter for attachment onto the pickup head of a surface roughness measuring instrument, said adapter comprising a housing which includes an upper mounting portion defining an open-ended recess shaped and dimensioned to receive snugly the stylus end of the pickup head when mounted thereon, said mounting portion of the adapter housing having a bottom opening for freely passing the pickup head stylus, said adapter housing also including tube means of reduced cross-section extending forward from said mounting portion at the lower end of the latter, said tube means tapering inwardly along its length toward its forward end and defining a bottom opening at its forward end, a lever extending lengthwise through said tube means and pivotally mounted midway along its length in said tube means, said lever being solid in cross-section and tapering along its length in either direction away from its pivotal mounting and forward of its pivotal mounting being completely disposed within said tube means, said tube means at the pivotal mounting of the lever being of thin-walled construction and the lever at its pivotal mounting being spaced from the inner surface of the tube means entirely around the lever, said lever at its pivotal mounting carrying a plug press fit transversely through the lever and having a length several times the wall thickness of the tube means thereat, a thin stiff wire press fit through the plug and thereby fixedly received therein to prevent relative displacement between the wire and the plug and lever, said wire at its opposite ends being snugly received in holes in opposite sides of said tube means which permit the wire to turn therein integral with the lever to thereby provide bearings for the pivotal movement of the lever in said tube means, said lever at its forward end carrying a stylus which projects freely down through said bottom opening in the tube means at the latter's forward end, said lever projecting rearward from its pivotal mounting and directly below said bottom opening in said mounting portion of the adapter housing presenting a flat upper face for engagement with the pickup head stylus, a spring acting against said lever to bias its rear end upward and its forward end downward, and said lever having a depending rear extremity which presents a top surface which inclines up toward said flat upper face on the lever for engagement by the tip of the pickup head stylus as the adapter is inserted onto the pickup head.

References Cited in the file of this patent

UNITED STATES PATENTS

| | | |
|---|---|---|
| 2,016,659 | Tydeman | Oct. 8, 1935 |
| 2,122,664 | Terry | July 5, 1938 |
| 2,345,022 | Williamson | Mar. 28, 1944 |
| 2,345,845 | Wells | Apr. 4, 1944 |
| 2,608,092 | Williamson | Aug. 26, 1952 |